Dec. 25, 1934.  F. A. PARSONS  1,985,688
MACHINE TOOL
Filed Nov. 26, 1930   5 Sheets-Sheet 1

INVENTOR
Fred A. Parsons

Dec. 25, 1934.　　F. A. PARSONS　　1,985,688
MACHINE TOOL
Filed Nov. 26, 1930　　5 Sheets-Sheet 3

Dec. 25, 1934.  F. A. PARSONS  1,985,688
MACHINE TOOL
Filed Nov. 26, 1930   5 Sheets-Sheet 4

INVENTOR
Fred A. Parsons

Dec. 25, 1934. F. A. PARSONS 1,985,688
MACHINE TOOL
Filed Nov. 26, 1930 5 Sheets-Sheet 5
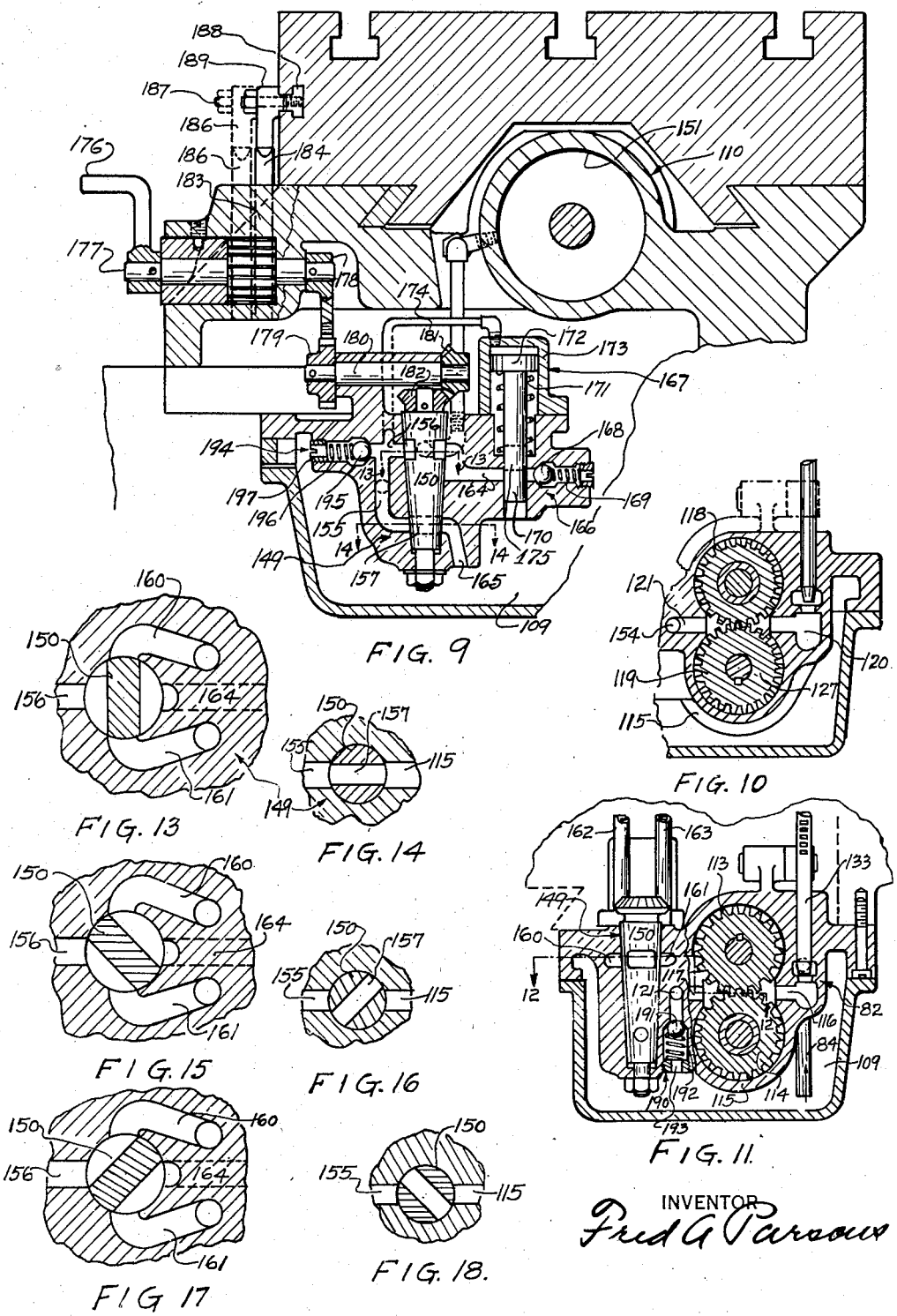
INVENTOR
Fred A Parsons Patented Dec. 25, 1934

1,985,688

UNITED STATES PATENT OFFICE 1,985,688

MACHINE TOOL

Fred A. Parsons, Milwaukee, Wis., assignor to Kearney & Trecker Corporation, West Allis, Wis., a corporation Application November 26, 1930, Serial No. 498,288

2 Claims. (Cl. 90—18)

This invention relates to machine tools, especially milling machines, and more particularly to transmission and control mechanism for such machines.

A main purpose is to provide a milling machine having a spindle transmission of improved form and including a fluid operable portion adapted to effect a variety of rate changes having very small increments of change between different rates.

Another purpose is to provide a spindle transmission in which a rate changer having relatively very small increments of rate change as, for instance, the fluid operable rate changer, previously mentioned, is supplemented by other rate change means whereby relatively small increments of rate change may be had over a comparatively very large range of rates.

Another purpose is to provide spindle transmissions, as previously mentioned, in improved combination with spindle rate control devices, and also in improved combination with the other transmission and control devices of machine tools, particularly milling machines.

Another purpose is to provide in a milling machine a hydraulic spindle transmission, or a hydraulic table drive, or both together capable of control substantially after the manner of well known control means for mechanically actuated machines, whereby operators familiar with previous mechanically operated machines may proceed with confidence to set up, adjust, and operate the machine in a familiar manner and without regard for or even knowledge of the construction involved.

A further purpose is to provide a milling machine having fluid operable portions both in the spindle transmission and in the feed transmission whereby a large part of the reacting forces incidental to the movement of a rotating milling cutter through the work material may be cushioned in a manner such that a considerable portion of the cushioning force is immediately expended in the fluid leakages inherent in hydraulic transmission devices.

A further purpose is to combine a hydraulic spindle drive and a hydraulic work drive for a milling machine in an improved manner and to provide improved control devices therefor.

A further purpose is to provide a milling machine in which the various purposes above mentioned are combined in an improved and simplified structural and operating relationship.

A further purpose is generally to simplify and improve the construction, operation, and control of machine tools, particularly milling machines, and still other purposes will be apparent from the specification.

The invention consists in the construction and combination of parts as herein illustrated, described, and claimed and in such modification of the structure illustrated as may be equivalent to the claims.

The same reference characters refer to the same parts throughout the specification and the various views of the drawings in which:

Fig. 9 is a vertical sectional view on the line 9—9 of Fig. 3.

Fig. 10 is a vertical sectional view on the line 10—10 of Fig. 3.

Fig. 11 is a vertical sectional view on the line 11—11 of Fig. 3.

Fig. 12 is a horizontal sectional view substantially on the line 12—12 of Fig. 11, the parts being shown slightly displaced from their normal relations to better disclose the fluid passages.

Figs. 13, 15, and 17 are sectional views on the line 13—13 of Fig. 9 showing a valve member in various positions.

Figs. 14, 16, and 18 are sectional views on the line 14—14 of Fig. 9 showing another part of the same valve in various positions.

Figure 2:
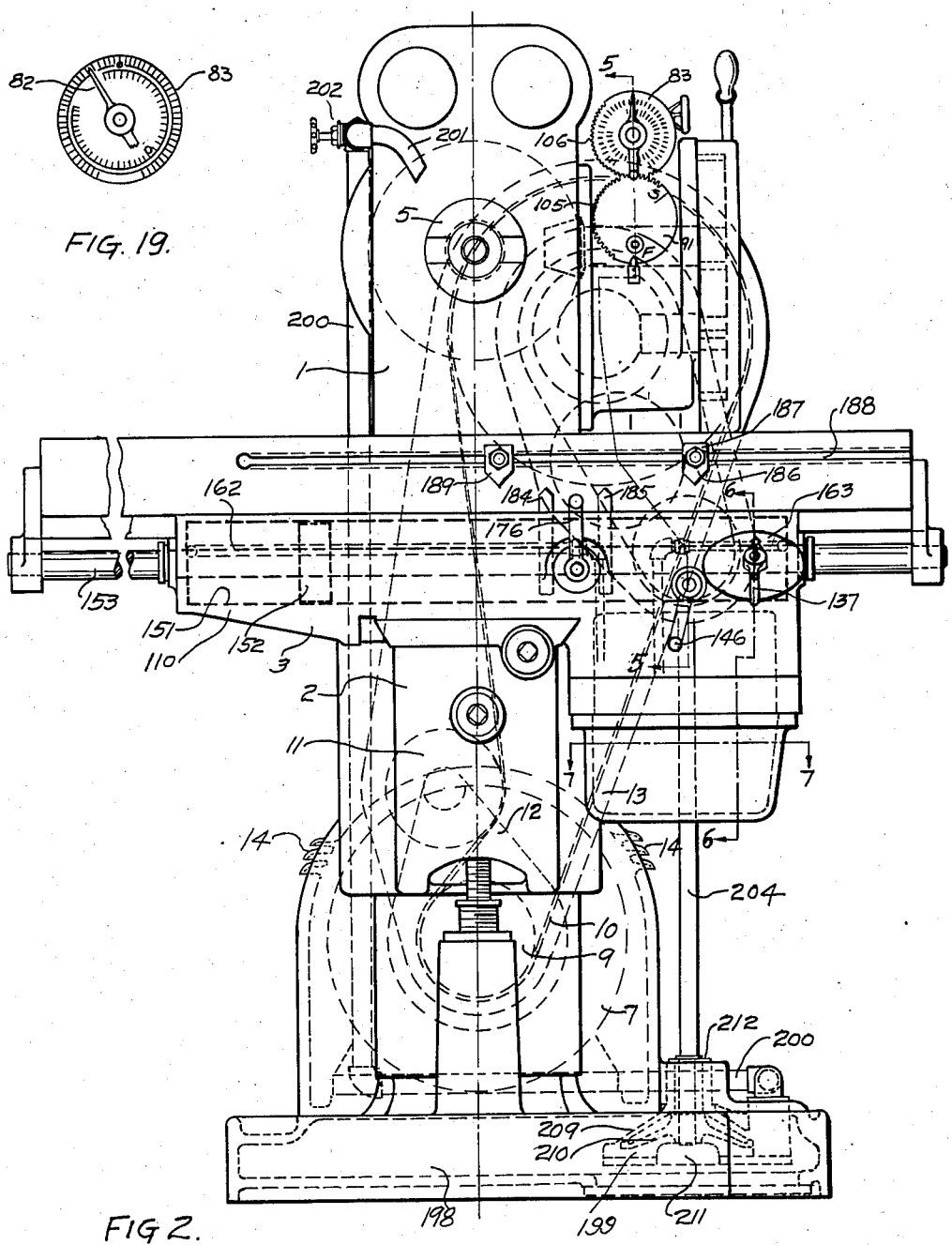
Fig. 2 is a front elevation of the same machine.

Fig. 19 is a front elevation somewhat enlarged of a dial member indicated in Fig. 2.

Figure 1:
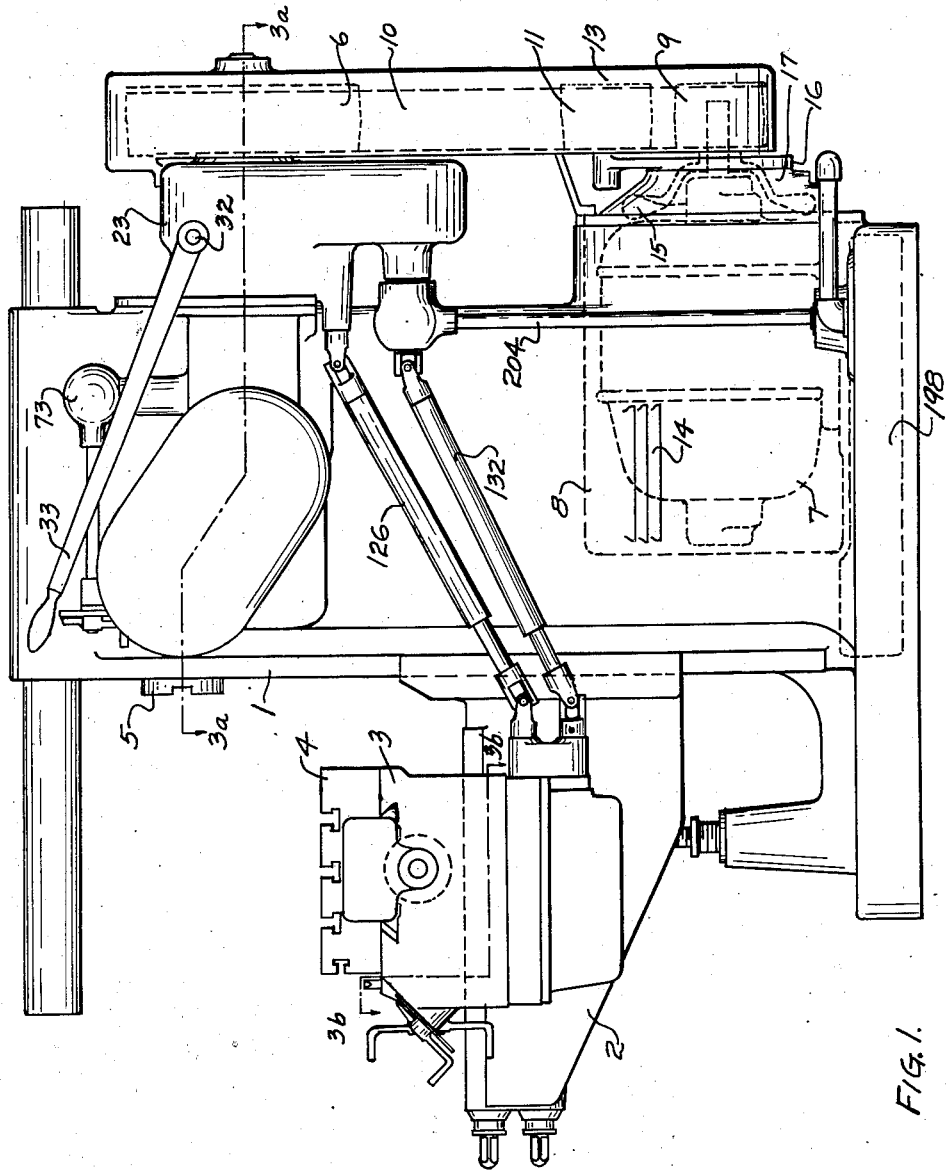
Fig. 1 is a right-side elevation of a milling machine embodying the invention.

The milling machine illustrated includes a column or support 1, Figs. 1 and 2, a knee or support 2, a saddle or support 3 guided for movement on knee 2 in a direction toward and from column 1, and a table or work support 4 guided in saddle 3 for movement to right or left in Fig. 2. Rotatably mounted in column 1 is a tool spindle or tool support 5 for which transmission mechanism is provided as follows: A pulley 6 is driven from any suitable power source such as a motor 7 enclosed in a suitable chamber 8 in bed 1 and having a pulley 9 adapted to drive pulley 6 by means of a belt 10. An idler pulley 11 journaled on an arm 12 with relation to pulley 9 is provided for adjusting the tension of belt 10 and a housing or guard 13 of suitable form is provided to enclose the parts.

Means are provided for air cooling motor 7, including louvers 14—14 for admission of air to chamber 8, the air being drawn in by a fan 15, Fig. 1, driven from the motor and exhausting through other louvers 16 formed in a cover member 17 fixed with column 1.

Figure 3:
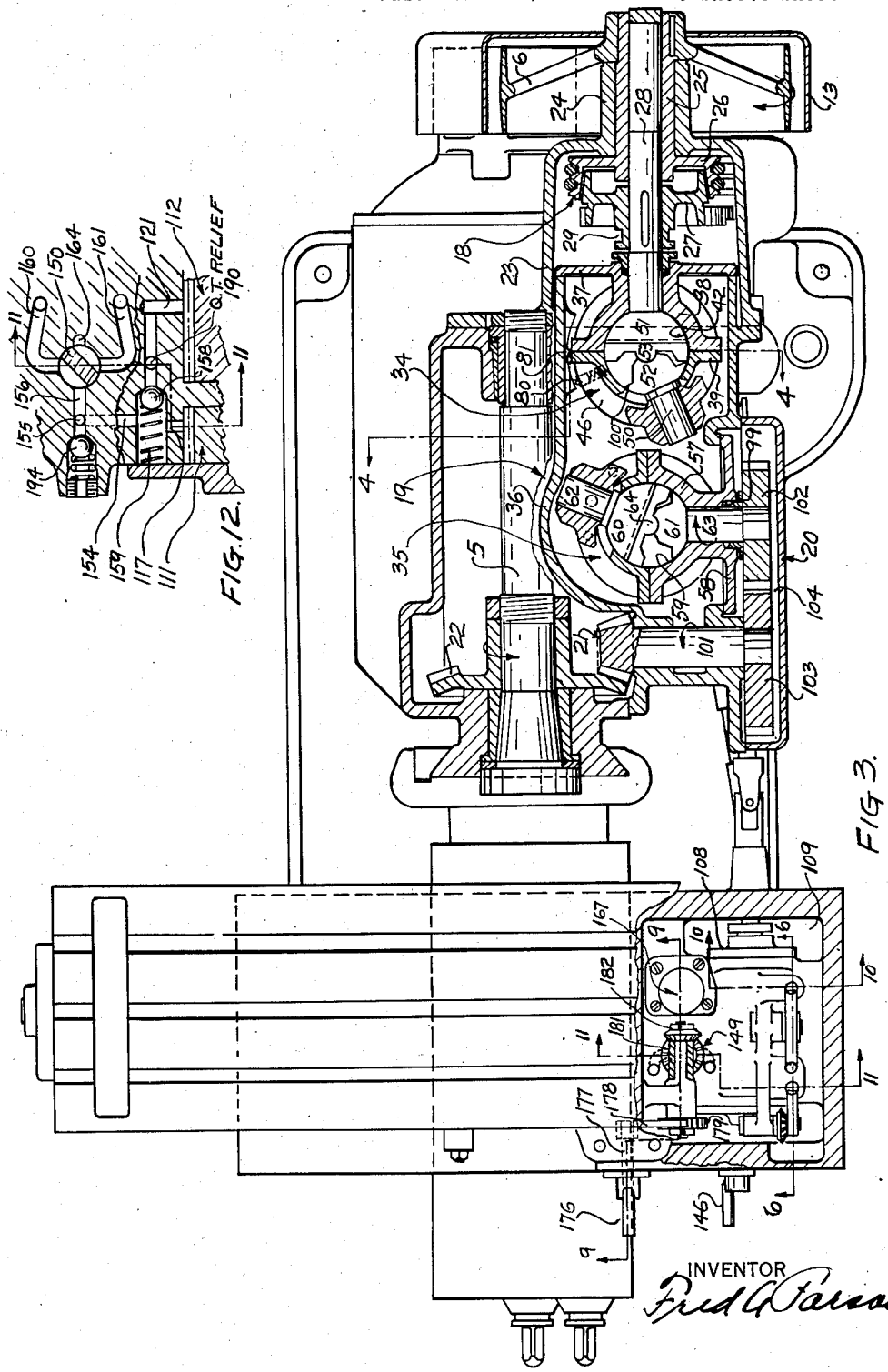
Fig. 3 is a sectional view, partially on the line 3a—3a and partially on the line 3b—3b of Fig. 1.

From pulley 6 the drive is transmitted to spindle 5 through a main clutch, generally denoted by numeral 18, Fig. 3, a hydraulic transmission or rate changer, generally denoted by numeral 19, a second rate changer, generally denoted by numeral 20, and bevel gears 21 and 22.

Clutch 18 is housed in a suitable casing 23 fixed with column 1 and providing a bearing 24 for a sleeve 25 rotatable therein and having fixed therewith pulley 6. Sleeve 25 also has fixed therewith an outer member 26 of clutch 18. An inner member 27 is adapted to frictionally engage member 26 and is slidably keyed with a shaft 28 journaled at one end in sleeve 25. Member 27 may be moved into and out of engagement with member 26 by means of a groove 29 formed in member 27 and engaged by a shifter fork 30, Fig. 5, having pivoted shoes 31 engaging groove 29 and fixed on a shaft 32 journaled in casing 23. Shaft 32 passes outside of casing 23, as shown in Fig. 1, and has fixed therewith a hand lever 33 for actuation of clutch 18 from a convenient point in front of the machine.

Shaft 28, Fig. 3, drives hydraulic transmission 19, which may be of any suitable form, but as here shown comprises a fluid pump and motor of a construction similar to that fully shown and described in United States Patents No. 1,678,049 and No. 1,678,050, issued July 24, 1928, and will, therefore, be only briefly described. It is to be understood, however, that many or all purposes of this invention can be met by any other suitable type of pump and motor and applicant does not wish to be limited in this respect except as defined by the claims.

Figure 4:
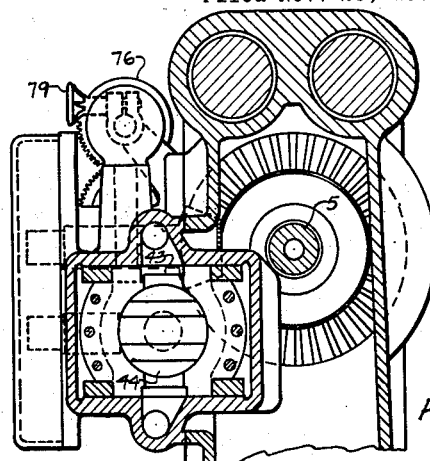
Fig. 4 is a vertical section on the line 4—4 of Fig. 3.

The transmission includes a fluid pump, generally denoted by numeral 34, driven from shaft 28 and supplying fluid to a fluid motor, generally denoted by numeral 35, the two being of identical construction, whereby a single description will suffice for both. Pump 34 is retained within a substantially closed casing 36 fixed with column 1 and having a removable cover portion 37 carrying a pump housing member 38. Removably fixed thereon is a pump housing 39. Portions of the housing members form trunnions 40 and 41, Fig. 5, respectively, on opposite sides of spherical chamber 42 having its center coinciding with the axis of shaft 28. Ports 43 and 44, Figs. 4 and 5, for conducting fluid to and from pump 34 communicate with the chamber 42 through the trunnions.

As will appear shortly, pump 34 is capable of forcing fluid in either direction, so that neither of ports 43 or 44 can be properly considered a suction or delivery port, but when one is acting as a suction port, the other is acting as a discharge port and vice versa. However, for convenience in the discussion of these ports, 43 will be considered as the suction or inlet port of the pump and 44 the discharge, it being understood that the direction of flow may be reversed on occasion whereupon 44 becomes the inlet and 43 the discharge port.

The trunnions 40 and 41 support ring members 45, 46 fixed with a member 47, whereby the rings and member form a unit supported and guided for movement about an axis passing through the center of the spherical chamber and at right angles to the axis of shaft 28, the trunnions having portions of reduced diameter for the accommodation of portions 48 and 49 of member 47. Journaled in member 47 is a shaft 50 having its axis at right angles to the axis about which member 47 moves and passing through the center of the spherical chamber in any position of member 47. Fixed on shafts 28 and 50, respectively, are members 51 and 52. An intermediate member 53 is pivoted both with member 51 and member 52, the respective pivots being at right angles to one another and each passing through the center of the spherical chamber.

Member 51 driven from shaft 28 drives intermediate member 53 which in turn drives member 52 and shaft 50, and the arrangement is such that there are formed within the spherical chamber four separate substantially closed chambers, each of which, when member 47 is adjusted for shaft 50 to stand at an angle relative to shaft 28, is alternately expanded and contracted during each revolution of the parts, and each of which is positioned by such rotation to communicate during expansion with the suction or inlet port 43 and during contraction with the pressure or outlet port 44, whereby fluid is forced through the pump. The amount of volume change of the chambers during rotation and therefore the rate of fluid delivered from the pressure port is dependent upon the adjustment of member 47, being zero when the member is adjusted for shaft 50 to be in axial alignment with shaft 28 whereby the position of adjustment of the member and shaft will determine the rate at which fluid will be forced through the pump and accordingly the rate at which motor 35 will be driven, so that the spindle rate may be changed while maintaining the drive shaft 28 at a constant speed.

A passage 54 leads from port 44 to a port 55 of motor 35 which may be considered an inlet port, but which, as above outlined in the case of pump 34, becomes a discharge or exhaust port under certain conditions. Motor 35, as above noted, is identical in construction with pump 34, having an outlet port 56, a housing member 57, Fig. 3, fixed with a cover portion 58, and having a spherical chamber 59 in which rotatable members 60 and 61 fixed respectively with shafts 62 and 63 and a central member 64 pivoted therebetween are fitted as in pump 34.

Figure 5:
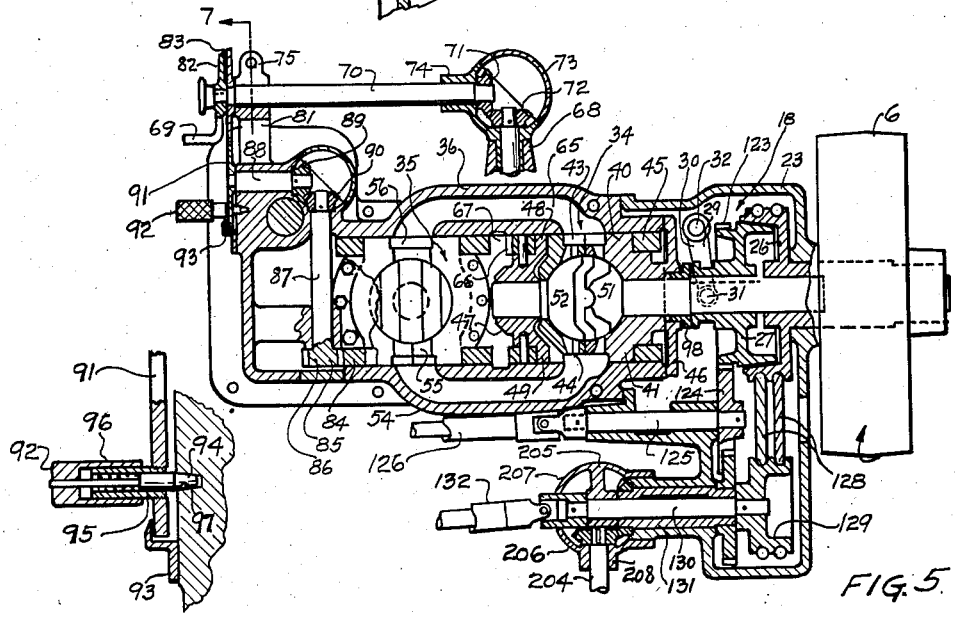
Fig. 5 is a sectional view on the line 5—5 of Fig. 2.

The arrangement provides four expansible chambers analogous to those of pump 34 which expand and contract during rotation of shafts 62 and 63 and communicate during expansion with inlet port 55, Fig. 5, and during contraction with outlet port 56 as in pump 34. Consequently the flow of fluid under pressure through port 55 into the expanding chambers causes rotation of the parts, including shafts 62 and 63, Fig. 3, during the following contraction of the chambers, the fluid flowing through outlet port 56, Fig. 5, and returning to pump 34 through a passage 65 leading to inlet port 43 of the pump, so that a complete fluid circuit is established from pump 34 through motor 35 back to pump 34.

Figure 7:
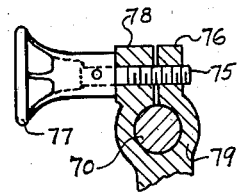
Fig. 7 is a sectional view on the line 7—7 of Fig. 5.

It will be noted that the variation in volume of the extensible chambers of the pump and motor is caused by the angular disposition of the shafts 28, 50 and 62, 63 respectively, which causes oscillation or pivotal movement of members 53 and 64. For obtaining such angular disposition or adjustment and varying it as desired, the following mechanism is provided:

For adjusting pump 34 the ring member 45 is provided with gear teeth 66 on a portion of its periphery, as shown in Fig. 5. A pinion 67 engages therewith and is fixed with a shaft 68 journaled in housing 36. Shaft 68 may be turned from a hand lever 69 through a shaft 70 having fixed therewith a bevel gear 71 meshing with a bevel gear 72 fixed with shaft 68, gears 71 and 72 being enclosed in a spherical or other suitable housing 73 providing a bearing 74 for shaft 70. Hand lever 69 may accordingly be moved for changing the angular relation of shaft 50 with shaft 28 for varying the rate of output of fluid from pump 34 or reversing the same. Suitable clamping means are provided for maintaining such adjustment of pump 34, in this case comprising a screw 75, Fig. 7, threaded in a lug 76 and adapted when suitably turned by a hand wheel 77 to act on a lug 78 to compress a portion of a bearing 79 about shaft 70 to prevent undesired rotation thereof from any adjusted position. In order to prevent member 47 from assuming a central or neutral position in which pump 34 and accordingly motor 35 and spindle 5 would be inoperative, means are provided including a spring pressed plunger 80, Fig. 3, slidably fitted in a suitable bore in ring member 46 and having cam surfaces adapted to cooperate with a cam member 81 fixed with casing 36.

Lever 69 has fixed therewith a pointer 82, Fig. 5, adapted to indicate against a scale 83, which will be further described presently.

Pump 34 may accordingly be adjusted to cause flow of fluid in either direction at any desired rate within its capacity and accordingly actuation of motor 35 at various rates in either direction. For adjustment of motor 35 a ring member 84 is provided with gear teeth 85 on a portion of its periphery for engagement with a pinion 86 fixed with a shaft 87 capable of actuation from a shaft 88 through bevel gears 89 and 90 fixed with the respective shafts and carrying a dial member 91 having a hand grip 92 for manual operation thereof. A pointer or index 93 fixed with casing 23 cooperates with dial 91 to indicate the adjustment of pump 35. Hand grip 92 provides a plunger 94, Fig. 8, slidable in a sleeve 95 fixed with dial 91 and pressed inwardly by a spring 96 for engagement with holes such as 97 formed in casing 36 for holding the parts in adjusted position. As many of holes 97 as desired may be provided, but in the present instance there are two, giving motor 35 two speeds for any given rate of fluid delivery from pump 34.

At points where movable members enter casing 36, suitable stuffing boxes of well-known construction are provided as at 98, Fig. 5, for shaft 28 and at 99, Fig. 3, for shaft 63. To prevent leakage of air into pump 34 or motor 35 at points such as 100, casing 36 may be filled with fluid to a level above any such leakage paths, and such a level may be maintained by continuously pumping fluid into the casing in accordance with a system proposed in an application of Fred A. Parsons, Serial No. 280,133, filed May 24, 1928; or the level may be maintained by bringing the entry points of all shafts above the required level of fluid as shown in a feed transmission Patent 1,740,744, (page six, lines 43-95), or other suitable expedients may be used. Such methods being known, as above mentioned, are not shown, although contemplated in the construction of the machine.

Shaft 63 of motor 35 drives a shaft 101 through above mentioned rate changer 20 which comprises gears 102 and 103 removably keyed with the respective shafts and meshed together within a housing 104 removably fixed with casing 36. The gears may be removed and interchanged or replaced with others of different ratios, also mutually interchangeable, to provide a variety of speed ratios between shafts 63 and 101. Rate changer 20 is accordingly effective for multiplying the range of speed changes available in transmission 19.

The spindle speeds, as above suggested, are indicated on dial 83, Fig. 5, by means of pointer or index 82, but it will be understood that, owing to the fact that motor 35 is of the variable displacement type, the simple provision of a scale on the dial will not give a correct indication of the speed of the spindle except at some one setting or adjustment of motor 35. Any suitable means may be used to cause dial 83 to indicate correct spindle speeds for different settings of motor 35, but as an illustration the provision is contemplated of a dial having a series of concentric or otherwise related scales, as shown in Fig. 19, each calibrated for various spindle speeds resulting from various adjustments of pump 34, a separate scale being provided for each setting or adjustment of motor 35. Thus if motor 35 has two speeds, there would be provided two scales, each having a central zero point and reading in spindle revolutions from either side thereof, the graduations on one side of the zero point representing spindle revolutions per minute in one direction, and those on the other side representing spindle revolutions per minute in the other direction. As shown in the figure, the two scales are circumferentially displaced from each other and in order to bring one or the other into correct reading relation with pointer 82, dial 83 is rotatably supported from shaft 70 and is adapted to be rotated by the action of the means for adjusting motor 35 as follows:

Dial 91, Fig. 5, has gear teeth 105 formed thereon engaging gear teeth 106 formed on dial 83 whereby when dial 91 is turned for adjusting pump 35, dial 83 will also be turned to bring into registration with pointer 82 the proper scale to indicate the spindle speeds which will result from adjustment of pump 34 under such adjustment of motor 35. It is apparent that this will correct the dial insofar as the adjustment of motor 35 is concerned.

It is also necessary to make compensation on the dial for the effect of rate changer 20 between motor 35 and spindle 5, since the scales on the dial, if correct for any one ratio in rate changer 20, will be incorrect for any other. However, for many machines the rate change gears need never be changed, the hydraulic transmission providing sufficient range of speed variation for most classes of work. When it does become necessary to use a different ratio in rate changer 20, it is planned to substitute a dial for dial 106 having different scales graduated to give correct readings of spindle speeds at the new ratio, hand lever 69 being removably keyed to shaft 70 and retained thereon as by a thumb nut 107 to facilitate changing the dials. It is further contemplated that instead of substituting other dials for dial 106, the dial may be provided with a further series of concentric scales suitably graduated to indicate the spindle speeds resulting from various adjustments of pump 34 for various ratios of rate changer 20, the different scales having some suitable marking to identify them with the various gear ratios available in rate changer 20 and cooperating with pointer 82 in the different positions of dial 83 in the same manner as the above scales. Thus it will be apparent that transmission 19 may be varied to give a virtually stepless change in speed throughout the increment between any two ratios obtainable through gears 102 and 103, Fig. 3, so that in effect a substantially stepless variation in speed of spindle 5 may be had throughout a very large range of rates with relation to drive shaft 28.

Figures 6, 8:
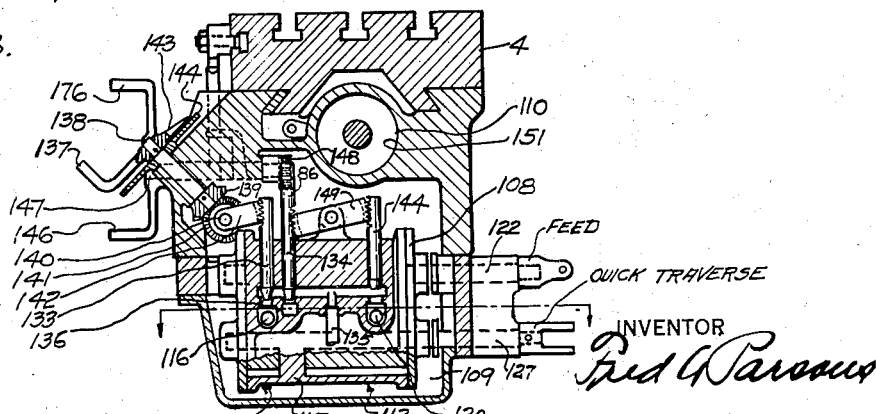
Fig. 6 is a vertical section on the line 6—6 of Figs. 2 and 3.
Fig. 8 is a sectional view of locking means indicated in Fig. 5.

Transmission mechanism is provided for the movement of table 4 including a fluid pump unit, generally denoted by numeral 108, Fig. 6, driven from pulley 6 through mechanism to be presently described and forcing fluid from a fluid reservoir 109 to a fluid motor, generally denoted by numeral 110, connected to drive table 4, although it is to be understood that many or all of the purposes can be served by other suitable hydraulic feed transmissions.

Such a transmission forms the subject of a patent application by Fred A. Parsons, Serial No. 321,250, filed November 22, 1928, and is completely disclosed and described therein, and accordingly a somewhat less comprehensive (although complete) description is given here.

Pump unit 108 includes a feed pump 111 of relatively small displacement and a rapid traverse pump 112 of relatively large displacement, pump 111 comprising gears 113 and 114, Fig. 11, meshed together within a casing 115 providing an inlet port 116 and an outlet port 117, and pump 112 comprising gears 118 and 119, Fig. 10, meshed together in another part of casing 115 providing an inlet port 120 and an outlet port 121. Pump 111 is driven by means of a shaft 122 fixed with gear 113, as follows: Clutch member 27, Fig. 5, has a gear 123 fixed therewith and driving a gear 124 fixed with a shaft 125 journaled in casing 23 and driving shaft 122 through an extensible universal joint shaft 126 of well-known type, as shown in Fig. 1.

Rapid traverse pump 112 is driven by a shaft 127 as follows: Clutch member 26, Fig. 5, is grooved for the reception of endless belts 128 arranged to drive a pulley 129 fixed on a shaft 130 journaled in a sleeve 131 which is in turn journaled in a suitable bearing in casing 23. Shaft 130 drives shaft 127 through an extensible universal joint shaft 132, as shown in Fig. 1.

The inlet port 116 of feed pump 111, Fig. 6, communicates with reservoir 109 through a feed regulating throttle comprising a plunger 133 and a cut-off throttle comprising a plunger 134 through suitable passageways connecting the throttle from a suction pipe 135, the plungers cooperating with suitable seats in the passageways to control the flow of fluid. Plunger 133 is adapted to selectively restrict the throttle opening 136 whereby to determine the rate of fluid flow through pump 111 in accordance with the setting thereof, while the cut-off throttle 134 is adapted to completely close the channel leading from suction pipe 135 to pump 111 when it is desired to stop the action of the feed pump. Thus the fluid flow to pump 111 may be completely cut off or predetermined to provide a desired feed rate in table 4.

The position of throttle 133 may be manually regulated by means of a lever 137 fixed on a shaft 138 upon which is fixed a bevel gear 139 meshed with a gear 140 fixed on a shaft 141, upon which is also fixed a segment 142 engaging suitable rack teeth in plunger 133. Fixed to move with lever 137 is a pointer or indicating member 143 adapted to indicate against a stationary dial or index member 144 the position of plunger 133.

The inlet port of the quick traverse pump 112 communicates with the fluid in reservoir 109 through a cut-off throttle, comprising a plunger 144 cooperating with a suitable seat and adapted to open or completely close the channel leading from the inlet port to suction pipe 135.

The plungers 134 and 144 are connected for dependent action by means of a pivoted lever or segment 145 having gear teeth on opposite ends respectively to engage plungers 134 and 144, so that either of the throttles is completely open when the other is completely closed. The plungers may be manually moved by means of a hand lever 146 fixed on a shaft 147 upon which is also fixed a segment 148 engaging suitable rack teeth in an extended end of plunger 134.

The output of each of the pumps 111 and 112 is lead to a reverser valve, generally denoted by numeral 149, Fig. 9, which includes a rotatable member 150 having cut-away portions, as particularly shown in Figs. 13, 15, and 17, and from the reverser valve through suitable channels to the one or the other end of a cylinder 151, Fig. 2, fixed with saddle 3 and constituting a part of motor 110. A piston head 152 is fitted in cylinder 151 and fixed with a piston rod 153 which is fixed at its ends for movement with table 4, the communicating channels being as follows:

The outlet port 117 of pump 111 communicates with a passage 154, Fig. 12, leading to reverser valve 149 adjacent an upper portion of valve member 150 through a channel 155 and a port 156, channel 155 also communicating with an outlet port 157 in a lower portion of valve member 150, as shown more particularly in Fig. 9.

The outlet port 121, Fig. 12, of pump 112 communicates with passage 154 through a check valve comprising a ball 158 pressed against a suitable seat in port 121 by means of a spring 159, the arrangement permitting fluid to pass from pump 112 into passage 154, but preventing it from passing from passage 154 to pump 112. Thus passage 154 and channel 155 may be supplied from either pump 111 or 112 according to whether valve 134 or 144 is open. Adjacent the upper portion of valve member 150 are ports 160 and 161, Figs. 12, 13, 15, and 17, communicating with passages 162 and 163, Fig. 2, respectively, leading to the end portions of cylinder 151 on opposite sides of piston 152. Adjacent the upper portion of valve member 150 there is also a port 164, Figs. 13, 15, and 17, leading to reservoir 109 through throttle devices later described. Adjacent the lower portion of valve member 150 there is a port 165, Fig. 9, communicating freely with reservoir 109. The arrangement is such that when valve member 150 is in the position shown in Fig. 15, port 156 is in communication with port 161 and fluid from either pump passes from port 156 into port 161 and through passage 163 to the right-hand end of cylinder 151, as seen in Fig. 2. Piston 152 and table 4 are thereby forced to the left and fluid in the left-hand end of the cylinder is then forced out through channel 162 and port 160 into port 164 from whence it passes to reservoir 109. At such time port 157 in valve member 150 stands at an angle to ports 155 and 165, as shown in Fig. 16, whereby fluid will not escape therethrough.

When valve member 150 is in the position shown in Fig. 17, the pressure ports of the pumps communicate with the left end, Fig. 2, of cylinder 151 through port 160 and passage 162, thereby moving the piston and table to the right, fluid from the right-hand end of the cylinder being forced to reservoir 109 through channel 163, port 161, and port 164, port 157 being again closed, as shown in Fig. 18.

When the valve is in a position mid-way between those of Figs. 15 and 17, as shown in Fig. 13, ports 160 and 161 are closed by valve member 150, and piston 152 and table 4 are locked against movement. At such times port 157 registers with ports 155 and 165, as shown in Fig. 14, and fluid coming from either of pumps 111 or 112 escapes to reservoir 109 through port 165, thereby relieving back pressure against such pump.

The port 164 communicates with reservoir 109 through a spring valve or throttle, generally denoted by numeral 166, Fig. 9, and another valve or throttle, generally denoted by numeral 167. Valve 166 comprises a ball 168 pressed against a suitable seat in port 164 by means of a spring 169 whereby to maintain a predetermined back pressure against escape of fluid from port 164. Valve 167 includes a plunger 170 pressed upwardly by means of a spring 171 and having fixed thereon a piston 172 movable in a cylinder 173. A pipe 174 communicates from port 156 to the upper end of cylinder 173, whereby to oppose spring 171 by means of fluid under pressure derived from passage 156. The area of piston 172 is such that when any material pressure exists in port 156, plunger 170 will be moved down against the pressure of spring 171 to a position to bring an opening 175 in the plunger 170 to a position relative to port 164 such that the flow of fluid is practically unrestricted, but if the pressure in port 156 falls below a predetermined point, as it would in case the cutter tended to cause the table to overrun motor 101, spring 171 will move plunger 170 to substantially close the outlet channel and thus build up immediately a back pressure in motor 110 and effectively prevent such overrun.

The reverser valve 150 may be moved by means of a hand lever 176, Figs. 3 and 9, fixed on a shaft 177 upon which is also fixed a segment 178 meshing with a gear 179 on a shaft 180 which turns valve member 150 through bevel gears 181 and 182. Valve 150 may also be moved by table dogs as follows: The shaft 177 has fixed thereon a pinion 183, Figs. 2 and 9, engaging suitable rack teeth on plungers or trip pins 184 and 185 respectively, positioned on opposite sides of the pinion. The arrangement is such that when lever 176 is moved to the left in Fig. 2, fluid will be applied to the end of cylinder 151 to move table 4 to the left, while plunger 185 will be raised and plunger 184 lowered. A dog 186 adjustably fixed on the table by means of a T-bolt 187 and a T-slot 188 will thereafter during the course of table movement contact plunger 185 at a predetermined point in the table movement and force the plunger downwardly, thereby bringing the lever 176 to a central position corresponding to the valve position shown in Fig. 13 to stop the table, there being complementary angular cam surfaces on the plunger and dog for this purpose. If lever 176 is oppositely moved for the movement of the table to the right, this moves plunger 184 upwardly after which it may be contacted by a similar dog 189 to similarly stop the table.

In the operation of the machine the feed pump 111 will be running whenever clutch 18 is engaged. In such case either a feed or a rapid traverse of the table may be had according to the position of lever 146, whereby fluid is admitted to the one or the other pump. If the spindle 5 is not running, only the rapid traverse pump 112 will be operative. The pump not in use will receive no fluid whereby it will consume very little power. If the lever 146 is positioned for the fluid pump 111 to be operative, the rate of table operation therefrom will depend upon the position of the feed control lever 137. Location of the feed control throttle 133 on the suction side of pump 111 is such that the rate of fluid pumped is substantially unaffected by the resistance against which the pump is working, the fluid being pressed through the throttle by atmospheric pressure which, being substantially constant, will predetermine the rate of fluid flow and consequently the rate of table movement substantially in exact accordance with the position of the feed control lever 137 and substantially independent of variations in the resistance or the load against which table 4 is operated.

Relief valves are provided to protect the transmission mechanism from damage caused by overloading as follows: A quick traverse pressure relief valve, generally denoted by numeral 190, Figs. 11 and 12, is positioned to pass fluid from port 121 when the fluid pressure therein exceeds a predetermined relatively low value. Valve 190 includes a ball 191 pressed by a spring 192 which, when overcome by fluid pressure against the ball, permits escape of fluid past the ball and into reservoir 109 through an opening 193.

A feed pressure relief valve, generally denoted by numeral 194, Figs. 9 and 12, is positioned to pass fluid from port 156 when the pressure therein exceeds a predetermined relatively high value. Valve 194 includes a ball 195 pressed by a spring 196 which, when overcome by the fluid pressure, permits escape of fluid through an opening 197 into reservoir 109. The valve 190, being positioned between the check valve 158, Fig. 12, and quick traverse pump 112, is not operable from the pressure of the feed pump 111, whereby the quick traverse pressure may be relieved at a relatively low point, which is desirable because of its relatively fast table rate, and without influencing the feed relief pressure.

It will be apparent that the reverser movements and also the change from feed to rapid traverse are adapted to be readily controlled automatically in accordance with the table movement, but since a variety of suitable control devices for such purpose are well known, they are not shown here.

Since the hydraulic transmission elements in the machine are virtually self-lubricating, the lubrication problem of the machine practically resolves itself into the lubrication of the spindle bearings and a few minor elements such as feed drive shaft 125. An elaborate system of lubrication is accordingly unnecessary and any familiar method or apparatus may be used for the purpose within the scope of the invention, and since many are well known, none are shown here.

A coolant system for the cutters is provided comprising a reservoir 198, Figs. 1 and 2, formed in the base of column 1 from which coolant is forced by a pump 199 through a pipe or duct 200 to a nozzle 201 for discharge upon the cutters, not shown, a regulating valve 202 being provided for controlling the discharge, the fluid returning to reservoir 198 in well-known manner through suitable passages, not shown. Pump 199 is driven from pulley 6 as follows: Gear 124, Fig. 5, driven from clutch member 27, as above outlined, meshes with and drives a gear 203 fixed with sleeve 131 and sleeve 131 drives the pump shaft 204 through bevel gears 205 and 206 fixed respectively with the sleeve and shaft within a substantially spherical housing 207 fixed with casing 23 and providing a bearing 208 for shaft 204.

Pump 199 may be of any suitable type, but as shown comprises a casing 209, Fig. 2, having an impeller 210 fixed on shaft 204 and rotatable in the casing. The casing also provides an inlet opening 211 and a bearing 212 for the lower portion of shaft 204.

It will be noted that pump 199 is driven from clutch member 27 which rotates only when clutch 18 is engaged. Accordingly pump 199 will be driven and coolant will flow only at such times as spindle 5 is running.

The above being a full and complete description of an illustrative embodiment of the invention, what is claimed is:

1. In a transmission, the combination of a driven member and a power source, means including a variable displacement fluid pump driven from said power source and a variable displacement rotary fluid motor connected for driving said member, passages adapted to conduct fluid between said pump and motor, a device for adjusting said pump for varying the rate of travel of said member, a device for adjusting said motor for varying the displacement thereof and operable independently of said pump adjusting device, and indicating means in part responsive to the adjustment of one of said devices and in part responsive to the adjustment of the other device and adapted to indicate the rate of movement of said member to result from such adjustment.

2. In a machine tool, the combination of a rotatable spindle, a power source, and means for rotating said spindle including a variable displacement fluid pump driven from said power source, a variable displacement rotary fluid motor connected for driving said spindle, means including channels for conducting fluid between said pump and said motor, means for varying the rate of actuation of said spindle including a device for adjusting said pump to vary the displacement thereof and a device for adjusting said motor to vary the displacement thereof and operable independently of said pump adjusting device, and indicating means responsive to the adjustment of said devices and operative to indicate the spindle speed resulting therefrom, said indicating means including an indicator movable in accordance with the movement of one of said devices and a graduated dial movable in accordance with the movement of the other device.

FRED A. PARSONS